US008642693B2

(12) United States Patent
Kim et al.

(10) Patent No.: US 8,642,693 B2
(45) Date of Patent: *Feb. 4, 2014

(54) SCRATCH-RESISTANT FLAMEPROOF THERMOPLASTIC RESIN COMPOSITION WITH IMPROVED COMPATIBILITY

(75) Inventors: Il Jin Kim, Uiwang-si (KR); Kee Hae Kwon, Uiwang-si (KR); Bok Nam Jang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 7 days.

This patent is subject to a terminal disclaimer.

(21) Appl. No.: 12/817,302

(22) Filed: Jun. 17, 2010

(65) Prior Publication Data
US 2010/0256288 A1 Oct. 7, 2010

Related U.S. Application Data

(63) Continuation-in-part of application No. PCT/KR2008/006870, filed on Nov. 21, 2008.

(30) Foreign Application Priority Data

Dec. 18, 2007 (KR) ........................ 10-2007-0133813
Oct. 31, 2008 (KR) ........................ 10-2008-0108020

(51) Int. Cl.
C08F 283/08 (2006.01)

(52) U.S. Cl.
USPC ........................... 524/508; 525/133; 525/148

(58) Field of Classification Search
USPC .................................. 524/508; 525/133, 148
See application file for complete search history.

(56) References Cited

U.S. PATENT DOCUMENTS

| | | | |
|---|---|---|---|
| 3,322,853 A | 5/1967 | Trementozzi et al. | |
| 3,839,513 A | 10/1974 | Patel | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,391,935 A | 7/1983 | Bialous et al. | |
| 4,400,333 A | 8/1983 | Neefe | |
| 4,632,946 A | 12/1986 | Muench et al. | |
| 4,692,488 A | 9/1987 | Kress et al. | |
| 4,745,029 A | 5/1988 | Kambour | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,061,558 A | 10/1991 | Fischer et al. | |
| 5,061,745 A | 10/1991 | Wittmann et al. | |
| 5,200,492 A * | 4/1993 | Ohnaga et al. | 428/64.7 |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A * | 7/1993 | Wroczynski | 524/109 |
| 5,239,001 A | 8/1993 | Fischer et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A | 4/1994 | Ishida et al. | |
| 5,449,557 A | 9/1995 | Liebler et al. | |
| 5,473,019 A | 12/1995 | Siol et al. | |
| 5,605,962 A | 2/1997 | Suzuki et al. | |
| 5,627,228 A | 5/1997 | Kobayashi | |
| 5,643,981 A | 7/1997 | Yang et al. | |
| 5,672,645 A | 9/1997 | Eckel et al. | |
| 5,731,390 A | 3/1998 | van Helmond | |
| 5,750,602 A | 5/1998 | Kohler et al. | |
| 5,833,886 A | 11/1998 | Dashevsky et al. | |
| 5,905,122 A | 5/1999 | Ohtsuka et al. | |

(Continued)

FOREIGN PATENT DOCUMENTS

CA 1 121 535 4/1982
CN 101061179 A 10/2007

(Continued)

OTHER PUBLICATIONS

European Search Report in counterpart European Application No. 08862371 dated Dec. 7, 2010, pp. 1-6.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).

(Continued)

Primary Examiner — Peter D Mulcahy
(74) Attorney, Agent, or Firm — Additon, Higgins, Pendleton & Ashe, P.A.

(57) ABSTRACT

Disclosed herein is a scratch-resistant flameproof thermoplastic resin composition, the resin composition comprising a base resin including (A) about 50 to about 90% by weight of a polycarbonate resin; (B) about 1 to about 50% by weight of a methacrylic copolymer resin with a refractive index of about 1.495 to about 1.590; and (C) about 0 to about 49% by weight of a (meth)acrylic resin, and (D) about 5 to about 40 parts by weight of a flame retardant, based on about 100 parts by weight of the base resin comprising (A)+(B)+(C). The resin composition of the present invention can have good flame retardancy, scratch resistance, colorability, and good appearance due to its improved compatibility. The resin composition of the invention can be used to produce plastic molded articles which can exhibit better physical properties than products produced using conventional resin compositions.

18 Claims, 4 Drawing Sheets

(56) References Cited

U.S. PATENT DOCUMENTS

| | | |
|---|---|---|
| 5,955,184 A | 9/1999 | Honda et al. |
| 6,022,917 A | 2/2000 | Kobayashi |
| 6,083,428 A | 7/2000 | Ueda et al. |
| 6,127,465 A | 10/2000 | Nodera |
| 6,174,945 B1 | 1/2001 | Kim et al. |
| 6,252,002 B1 | 6/2001 | Yamada et al. |
| 6,369,141 B1 | 4/2002 | Ishii et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Eckel et al. |
| 6,576,161 B2 | 6/2003 | Lim et al. |
| 6,596,794 B1 | 7/2003 | Eckel et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0240831 A1 | 9/2010 | Kim et al. |
| 2010/0256288 A1 | 10/2010 | Kim et al. |
| 2011/0009524 A1* | 1/2011 | Kwon et al. ................. 523/122 |
| 2011/0021677 A1 | 1/2011 | Kwon et al. |
| 2011/0040019 A1 | 2/2011 | Kwon et al. |
| 2011/0160380 A1 | 6/2011 | Kwon et al. |

FOREIGN PATENT DOCUMENTS

| | | |
|---|---|---|
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-316580 A | 11/2001 |
| JP | 2002-080676 | 3/2002 |
| JP | 2002-348457 A | 12/2002 |
| JP | 2005-247999 A | 9/2005 |
| JP | 2006-131833 | 5/2006 |
| JP | 2006-249288 A | 9/2006 |
| JP | 2006-249292 A | 9/2006 |
| JP | 2006-257126 | 9/2006 |
| JP | 2006-257284 A | 9/2006 |
| JP | 2006-342246 A | 12/2006 |
| JP | 2007-023227 A | 2/2007 |
| JP | 2008-292853 | 12/2008 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002- 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-79118 A | 9/2004 |
| KR | 10-0767428 B1 | 10/2007 |
| KR | 10-902352 | 6/2009 |
| WO | 99 19383 A1 | 4/1999 |
| WO | 99/57198 A1 | 11/1999 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |

(56) References Cited

FOREIGN PATENT DOCUMENTS

| | | |
|---|---|---|
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 A1 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
International Search Report in counterpart International Application No. PCT/KR2008/006870, dated May 28, 2009.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
Advisory Action in commonly owned U.S. Appl. No. 12/631,018 mailed Nov. 7, 2012, pp. 1-3.
Search Report in commonly owned European Patent Application No. Ep 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
European Search Report for commonly owned European Application No. EP 04808586, completed on Sep. 25, 2007.
Chinese Office Action in commonly owned Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
International Search Report in commonly owned International Application No. PCT/KR2008/007838 mailed Aug. 18, 2009, pp. 1-2.
Office Action in commonly owned U.S. Appl. No. 12/898,012 mailed Dec. 21, 2012, pp. 1-5.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
Japanese Office Action in commonly owned Japanese Application No. 2010-539284, dated Sep. 11, 2012, pp. 1-3.
Notice of Allowance in commonly owned U.S. Appl. No. 12/972,795 mailed May 24, 2013, pp. 1-8.
Notice of Allowance in commonly owned U.S. Appl. No. 12/884,549 mailed Apr. 11, 2012, pp. 1-8.
Final Office Action in commonly owned U.S. Appl. No. 12/884,549 mailed Dec. 12, 2012, pp. 1-7.
Office Action in commonly owned U.S. Appl. No. 12/898,012, mailed Dec. 21, 2012, pp. 1-6.
European Search Report in commonly owned European Application No. 08873329.0 dated Dec. 14, 2012, pp. 1-7.
Office Action in commonly owned U.S. Appl. No. 12/972,795 mailed Jan. 18, 2013, pp. 1-9.

\* cited by examiner

SCRATCH-RESISTANT FLAMEPROOF THERMOPLASTIC RESIN COMPOSITION WITH IMPROVED COMPATIBILITY

CROSS-REFERENCE TO RELATED APPLICATIONS

This application is a continuation-in-part of International Application No. PCT/KR2008/006870, filed Nov. 21, 2008, pending, which designates the U.S., published as WO 2009/078593, and is incorporated herein by reference in its entirety, and claims priority therefrom under 35 USC Section 120. This application also claims priority under 35 USC Section 119 from Korean Patent Application No. 10-2007-0133813, filed Dec. 18, 2007, in the Korean Intellectual Property Office, and Korean Patent Application No. 10-2008-0108020, filed Oct. 31, 2008, in the Korean Intellectual Property Office, the entire disclosure of each of which is also incorporated herein by reference.

FIELD OF THE INVENTION

The present invention relates to a scratch-resistant flameproof thermoplastic resin composition.

BACKGROUND OF THE INVENTION

Generally, thermoplastic resins have lower specific gravity than glasses and metals, and have good physical properties such as moldability and impact resistance. Recently, plastic products have rapidly replaced conventional glass or metal products and have been widely used in electrical and electronic goods, as large, light-weight, and economical products are becoming a widespread trend. Accordingly, as good appearance and function of the plastic products have become important when they are used in housings of electrical and electronic goods, there is a need for plastic materials which can provide exterior scratch resistance, impact resistance, and flame retardancy.

Conventionally, a hard coating method has been used to improve the scratch resistance of plastic products. The hard coating method includes coating a surface of an injection-molded resin with an organic-inorganic hybrid material and curing the organic-inorganic hybrid material on the surface of the resin using heat or ultra violet light. However, this method requires an additional coating process which can increase processing time and manufacturing costs and may also cause environmental problems. Recently, with increased interest in protecting the environment and in reducing manufacturing costs, there is a need for a non-coated resin. Thus the hard coating method may not be used but the resin still should have good scratch resistance. Also, it is important to develop a resin with good scratch resistance for the housing manufacturing industry.

One proposed method for improving both scratch resistance and flame retardancy is to alloy polycarbonate (PC) resin and a methacrylate resin, such as polymethylmethacrylate (PMMA).

Polycarbonate resin has good mechanical strength, transparency, thermal stability, self-extinguishing property, and dimensional stability and has been widely used in electrical and electronic products and parts of automobiles. Further, the polycarbonate resin can obtain flame retardancy even with a small amount of flame retardant, compared to a conventional polymer, since its chemical structure allows good flame retardancy. However, good scratch resistance cannot be obtained only with the polycarbonate resin since it has a low pencil hardness of B or so.

On the other hand, although polymethylmethacrylate resin has good scratch resistance, that is, it has a high pencil hardness of 3H-4H, it still has a disadvantage in that it is hard to obtain flame retardancy with a conventional flame retardant.

Accordingly, blending a PC resin and a PMMA resin has been suggested to improve both scratch resistance and flame retardancy. However, although the PC resin and the PMMA resin are melt-kneaded at a high temperature, they divide into separate phases due to their lack of compatibility. It is also very difficult for an alloy of PC and PMMA to be used in housings of electrical and electronic products. Due to the different refractive indices of the PC resin and the PMMA resin, that is, 1.59 and 1.49, respectively, the alloy of PC resin and PMMA resin may scatter light which makes it difficult to provide color with high chroma, and a melt joining line is clearly shown during extrusion.

Korean Patent Publication Laid-open No. 2004-79118 discloses a method of lowering the molecular weight of polycarbonate during a kneading process using metal stearic acid ester in order to improve the compatibility between a polycarbonate resin and a methacrylate resin. However, the method has a disadvantage in that a blend of the polycarbonate and the methacrylate resin has significantly low mechanical properties.

SUMMARY OF THE INVENTION

The present inventors have developed a scratch-resistant flameproof thermoplastic resin composition that can have both high transparency and high colorability in addition to reduced deterioration of thermal resistance. The invention uses a methacrylic copolymer resin having a high refractive index together with a flame retardant in specific amounts when blending a polycarbonate resin and a (meth)acrylic resin. The addition of the methacrylic copolymer resin and/or flame retardant in the specified amounts can improve compatibility between a polycarbonate resin and a (meth)acrylic resin and decrease the difference between the refractive index of the two resins. The invention can provide a scratch-resistant flameproof thermoplastic resin composition having a good balance of physical properties such as good flame retardancy, scratch resistance, colorability, transparency, and/or good appearance without a compatibilizer. The scratch-resistant flameproof thermoplastic resin composition can be useful in the production of various electrical and electronic appliances, parts of automobiles, lenses, window glasses, and the like, due to its good balance of properties such as flame retardancy, scratch resistance, colorability, transparency, and/or appearance.

The present invention further provides a molded article produced from the scratch-resistant flameproof thermoplastic resin composition.

Other aspects, features and advantages of the present invention will be apparent from the ensuing disclosure and appended claims.

An aspect of the present invention provides a scratch-resistant flameproof thermoplastic resin composition. The resin composition comprises a base resin comprising (A) about 50 to about 90% by weight of a polycarbonate resin; (B) about 1 to about 50% by weight of a methacrylic copolymer resin with a refractive index of about 1.495 to about 1.590; and (C) about 0 to about 49% by weight of a (meth)acrylic resin, and (D) about 5 to about 40 parts by weight of a flame retardant, based on about 100 parts by weight of the base resin comprising (A)+(B)+(C).

In exemplary embodiments of the present invention, the methacrylic copolymer resin (B) is a modified resin including an aromatic methacrylate, an aliphatic methacrylate, or a combination thereof. In exemplary embodiments, the methacrylic copolymer resin (B) comprises (b1) about 10 to about 100% by weight of an aromatic methacrylate, an aliphatic methacrylate, or a combination thereof; and (b2) about 0 to about 90% by weight of a mono-functional unsaturated monomer. The mono-functional unsaturated monomer (b2) can include at least one monomer selected from the group consisting of (meth)acrylic acid esters; acrylic acid esters; unsaturated carboxylic acids; acid anhydrides; hydroxyl group containing esters; (meth)acrylamides; unsaturated nitriles; allyl glycidyl ethers; glycidyl methacrylates; aromatic vinyl monomers; and combinations thereof.

The methacrylic copolymer resin (B) may have a weight average molecular weight of about 5000 to about 300,000. In an exemplary embodiment, the methacrylic copolymer resin (B) may have a weight average molecular weight of about 5000 to about 100,000 or about 8000 to about 145,000. In another exemplary embodiment, the methacrylic copolymer resin (B) may have a weight average molecular weight of about 130,000 to about 200,000. In other exemplary embodiments, the methacrylic copolymer resin (B) may have a weight average molecular weight of about 200,000 to about 300,000.

The (meth)acrylic resin (C) may be a homopolymer, copolymer of (meth)acrylic monomer, or mixture thereof.

The flame retardant (D) may be a phosphorus-containing flame retardant, a halogen-containing flame retardant, an inorganic flame retardant, or a combination thereof.

The resin composition may further comprise at least one or more additives selected from the group consisting of surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, anti-static agents, pigments, dyes, flameproof agents, and combinations thereof.

In an exemplary embodiment, the resin composition can have a scratch width of about 220 to about 340 μm measured by ball-type scratch profile test (BSP test), a total light transmittance of about 25 to about 45% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 75 to about 99° C. measured in accordance with ASTM D-1525.

In another exemplary embodiment, the resin composition can have a scratch width of about 288 to about 340 μm measured by ball-type scratch profile test (BSP test), a total light transmittance of about 38 to about 45% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 78 to about 99° C. measured in accordance with ASTM D-1525.

In other exemplary embodiments, the resin composition can have a scratch width of about 225 to about 289 μm measured by ball-type scratch profile test (BSP test), a total light transmittance of about 25 to about 35% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 78 to about 99° C. measured in accordance with ASTM D-1525.

In an exemplary embodiment, the resin composition includes (A) a polycarbonate resin and (B) a methacrylic copolymer resin with a refractive index of about 1.495 to about 1.590 which are not discrete from each other, but form a homogeneous continuous phase, and the flame retardant (D) is dispersed therein.

Another aspect of the present invention provides molded articles produced from the resin composition.

DETAILED DESCRIPTION OF THE INVENTION

Figure 1A:
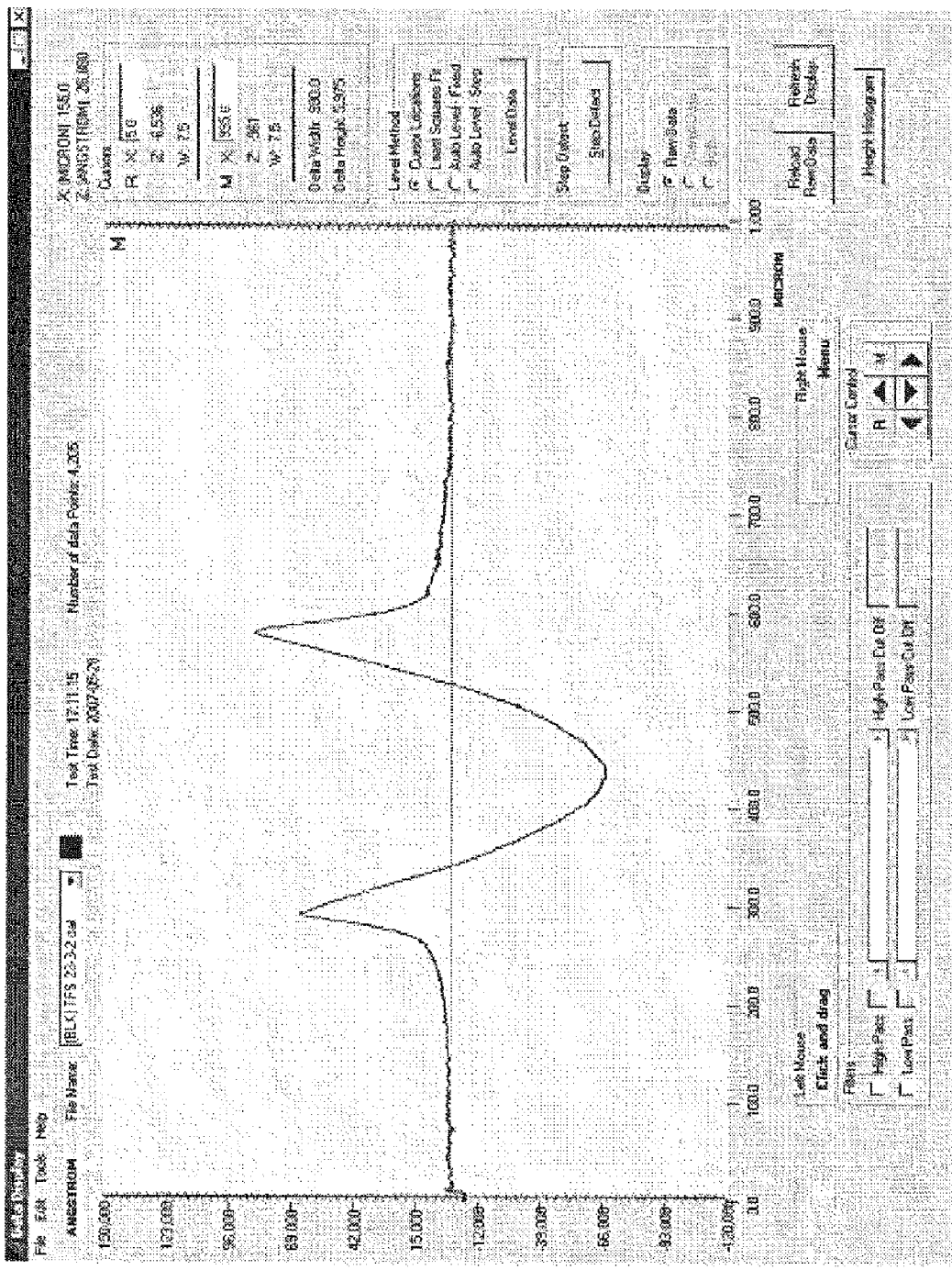
FIG. 1(a) is a scratch profile measured by ball-type scratch profile (BSP) test of a specimen prepared in Example 4 and (b) is a scratch profile measured by ball-type scratch profile (BSP) test of a specimen prepared in Comparative Example 6.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin of the present invention may be prepared by any conventional method well known to those skilled in the art. For example, the polycarbonate resin may be prepared by reacting dihydric phenol compound with phosgene in the presence of a catalyst and a molecular weight controlling agent. Also, the polycarbonate resin may be prepared by transesterification of a carbonate precursor such as dihydric phenol compound and diphenylcarbonate.

The dihydric phenol compound may be a bisphenol compound, for example 2,2-bis(4-hydroxyphenyl)propane (bisphenol A). The bisphenol A may be partially or completely substituted with other dihydric phenol(s). In addition to bisphenol A, examples of dihydric phenols may include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfon, bis(4-hydroxyphenyl)sulfoxide, bis(4-hydroxyphenyl)ketone, bis(4-hydroxyphenyl)ether, halogenated bisphenols such as 2,2-bis(3,5-dibromo-4-hydroxyphenyl)propane, and the like, and combinations thereof.

However, the dihydric phenol compound applicable for preparing the polycarbonate resin is not limited to the aforementioned compounds.

Furthermore, the polycarbonate resin used in the present invention may be a homopolymer or a copolymer of two or more types of dihydric phenols, or a mixture thereof.

Examples of polycarbonate resin in the present invention may also include, without limitation, linear polycarbonate resins, branched polycarbonate resins, polyester carbonate copolymer resins, and the like, and combinations thereof.

The linear polycarbonate resin may be a bisphenol A-based polycarbonate resin. The branched polycarbonate may be prepared by reacting poly-functional aromatic compounds such as trimelitic anhydride, trimelitic acid, and the like, with dihydric phenol compounds and carbonate precursors. The polyester carbonate copolymer resin may also be prepared by reacting di-functional carboxylic acid with dihydric phenol compounds and carbonate precursors.

In an exemplary embodiment, the polycarbonate resin has a weight average molecular weight of about 10,000 to about 200,000 g/mol, for example about 15,000 to about 80,000 g/mol, or about 20,000 to about 50,000 g/mol.

According to the present invention, the base resin including (A)+(B)+(C) as defined herein may include the polycarbonate resin in an amount of about 50 to about 90% by weight, for example about 55 to about 85% by weight, and as another example about 60 to about 80% by weight. In some embodiments, the base resin may include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the polycarbonate can be in a range from about any of the foregoing amounts to about any other of the foregoing amounts. If the base resin includes the polycarbonate in an amount of less than about 50% by weight, it may difficult to obtain good mechanical properties and flame retardancy. If the base resin includes the polycarbonate in an amount of more than about 90% by weight, it can be difficult to obtain improved scratch resistance.

When a polycarbonate resin is blended with an acrylic resin, the resultant blend can exhibit problems of low colorability and appearance when the polycarbonate is included in an amount within this range of about 50 to about 90% by weight due to the incompatibility of the polycarbonate and acrylic resins. Thus there is a need to improve the compatibility of polycarbonate and acrylic resins when the polycarbonate is used in an amount within this range.

In an exemplary embodiment, the base resin may include the polycarbonate resin in an amount of about 55 to about 85% by weight. In another exemplary embodiment, the base resin may include the polycarbonate resin in an amount of about 75 to about 90% by weight. In another exemplary embodiment, the base resin may include the polycarbonate resin in an amount of about 50 to about 70% by weight.

(B) Methacrylic Copolymer Resin with High Refractive Index

The methacrylic copolymer resin (B) with high refractive index of the present invention has a refractive index of about 1.495 to about 1.590. The methacrylic copolymer resin (B) with high refractive index is an acrylic resin modified with an aromatic methacrylate, an aliphatic methacrylate, or a combination thereof. The methacrylic copolymer resin (B) with high refractive index may be prepared by conventional methods such as bulk polymerization, emulsion polymerization, and suspension polymerization.

In an exemplary embodiment, the methacrylic copolymer resin (B) may comprise (b1) about 10 to about 100% by weight of an aromatic methacrylate, aliphatic methacrylate, or a combination thereof and (b2) about 0 to about 90% by weight of a mono-functional unsaturated monomer.

In some embodiments, the methacrylic copolymer resin (B) may include (b1) the aromatic methacrylate, aliphatic methacrylate, or a combination thereof in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the (b1) aromatic methacrylate, aliphatic methacrylate, or combination thereof can be in a range from about any of the foregoing amounts to about any other of the foregoing amounts.

In some embodiments, the mono-functional unsaturated monomer (b2) may be present, i.e., in an amount greater than about 0% by weight. In some embodiments, the methacrylic copolymer resin (B) may include (b2) the mono-functional unsaturated monomer in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. In other embodiments of the invention, the mono-functional unsaturated monomer (b2) may not be present (i.e., 0% by weight). Further, according to some embodiments of the present invention, the amount of the mono-functional unsaturated monomer can be in a range from about any of the foregoing amounts to about any other of the foregoing amounts.

If the amount of the aromatic methacrylate, aliphatic methacrylate, or combination thereof is less than about 10% by weight, the average refractive index of polymerized acrylic copolymer resin may be lowered to about 1.495 or less. In another exemplary embodiment, the methacrylic copolymer resin (B) may comprise (b1) about 10 to about 49% by weight of an aromatic methacrylate, aliphatic methacrylate, or a combination thereof and (b2) about 51 to about 90% by weight of a mono-functional unsaturated monomer. In other exemplary embodiments, the methacrylic copolymer resin (B) may comprise (b1) about 50 to about 100% by weight of an aromatic methacrylate, aliphatic methacrylate, or a combination thereof and (b2) about 0 to about 50% by weight of a mono-functional unsaturated monomer. In other exemplary embodiments, the methacrylic copolymer resin (B) may comprise (b1) about 25 to about 75% by weight of an aromatic methacrylate, aliphatic methacrylate, or a combination thereof and (b2) about 25 to about 75% by weight of a mono-functional unsaturated monomer.

In some exemplary embodiments, the aromatic methacrylate, aliphatic methacrylate or combination thereof is represented by the following Chemical Formula 1, Chemical Formula 2 or a combination thereof.

[Chemical Formula 1]

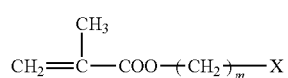

wherein m is an integer from 0 to 10, and X includes a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group.

[Chemical Formula 2]

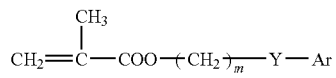

wherein m is an integer from 0 to 10, Y is oxygen (O) or sulfur (S), and Ar includes a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Examples of the aromatic or aliphatic methacrylate may include, but are not limited to, cyclohexyl methacrylate, 2-ethylphenoxy methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate. These may be used alone or in combination with one another.

Examples of the mono-functional unsaturated monomers (b2) may include, without limitation, (meth)acrylic acid esters; acrylic acid esters; unsaturated carboxylic acids; acid anhydrides; hydroxyl group containing esters; (meth)acrylamides; unsaturated nitriles; allyl glycidyl ethers; glycidyl methacrylates; vinyl aromatic monomers; and the like; and combinations thereof.

In exemplary embodiments, the mono-functional unsaturated monomer (b2) may be selected from the group consisting of methacrylic acid ester monomers such as but not limited to methyl methacrylate, ethyl methacrylate, propyl methacrylate, butyl methacrylate and benzyl methacrylate; acrylic acid ester monomers such as but not limited to methyl acrylate, ethyl acrylate, propyl acrylate, butyl acrylate, and 2-ethyl hexyl acrylate; unsaturated carboxylic acid monomers such as but not limited to acrylic acid and methacrylic acid; acid anhydride monomers such as but not limited to maleic anhydride; hydroxyl group containing ester monomers such as but not limited to 2-hydroxyethyl acrylate, 2-hydroxypropyl acrylate, and monoglycerol acrylate; (meth)acrylamide monomers such as but not limited to acryl amide and methacryl amide; unsaturated nitrile monomers such as but not limited to acrylonitrile and methacrylonitrile; allyl glycidyl ethers; glycidyl methacrylates; and aromatic vinyl monomers including styrenic monomers such as but not limited to styrene and α-methyl styrene. These may be used alone or in combination with one another.

In exemplary embodiments, the methacrylic copolymer resin with high refractive index may be a homopolymer including at least an aromatic or aliphatic methacrylate having a structure represented by the aforementioned Chemical Formula 1 or Chemical Formula 2. In other exemplary embodiments, the methacrylic copolymer resin with high refractive index may be a copolymer including at least an aromatic or aliphatic methacrylate having a structure represented by the aforementioned Chemical Formula 1 or Chemical Formula 2 or a combination thereof. In another exemplary embodiment, the methacrylic copolymer resin with high refractive index may be a copolymer including the mono-functional unsaturated monomer and at least an aromatic or aliphatic methacrylate having a structure represented by the aforementioned Chemical Formula 1 or Chemical Formula 2 or a combination thereof. In other exemplary embodiments, the methacrylic copolymer resin with high refractive index may be a mixture of the aforementioned homopolymers or copolymers.

The methacrylic copolymer resin with high refractive index has a higher refractive index than that of conventional acrylic copolymers. The methacrylic copolymer resin with high refractive index may be prepared to have a refractive index of about 1.495 to about 1.590, whereas conventional polycarbonate resins have a refractive index of about 1.59 and polymethylmethacrylate has a refractive index of about 1.49. In an exemplary embodiment, the methacrylic copolymer resin with high refractive index (B) may have a refractive index of about 1.51 to about 1.58. In another exemplary embodiment, the methacrylic copolymer resin with high refractive index (B) may have a refractive index of about 1.50, 1.51, 1.515, 1.52, 1.525, 1.53, 1.535, 1.54, 1.545, 1.55, 1.555, 1.56, 1.565, 1.57, 1.575, 1.58 or 1.585. Further, according to some embodiments of the present invention, the methacrylic copolymer resin with high refractive index (B) may have a refractive index in a range from about any of the foregoing refractive indices to about any other of the foregoing refractive indices.

The methacrylic copolymer resin with high refractive index (B) may have a linear structure.

The methacrylic copolymer resin with high refractive index (B) may have a weight average molecular weight of about 5,000 to about 300,000 g/mol. In an exemplary embodiment, the methacrylic copolymer resin (B) with high refractive index may have a weight average molecular weight of about 5,000 to about 100,000 g/mol or about 8,000 to about 145,000 g/mol. In another exemplary embodiment, the methacrylic copolymer resin (B) with high refractive index may have a weight average molecular weight of about 130,000 to about 200,000 g/mol. In other exemplary embodiments, the methacrylic copolymer resin (B) with high refractive index may have a weight average molecular weight of about 200,000 to about 300,000 g/mol.

The base resin including components (A)+(B)+(C) as defined herein may include the methacrylic copolymer resin with high refractive index (B) in an amount of about 1 to about 50% by weight. In some embodiments, the base resin may include the methacrylic copolymer resin with high refractive index (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the methacrylic copolymer resin with high refractive index (B) can be in a range from about any of the foregoing amounts to about any other of the foregoing amounts. If the amount of the methacrylic copolymer resin with high refractive index (B) is more than about 50% by weight, a flow mark may be formed in a molding process, and flame retardancy and thermal resistance may be deteriorated. In exemplary embodiments, the base resin may include the methacrylic copolymer resin with high refractive index (B) in an amount of about 15 to about 50% by weight, for example about 20 to about 50% by weight. Within these ranges, it is possible to obtain an excellent balance of physical properties. In other exemplary embodiments, the base resin may include the methacrylic copolymer resin with high refractive index (B) in an amount of about 18 to about 45% by weight.

(C) (Meth)acrylic Resin

The (meth)acrylic resin of the present invention is a copolymer resin prepared by using a (meth)acrylic monomer. The (meth)acrylic resin may be prepared by conventional methods such as bulk polymerization, emulsion polymerization, and suspension polymerization.

Furthermore, the (meth)acrylic resin may be a homopolymer or a copolymer of two or more types of (meth)acrylic monomers, or a mixture thereof.

In an exemplary embodiment, the (meth)acrylic resin (C) may have a weight average molecular weight of about 5,000 to about 300,000. In another exemplary embodiment, the (meth)acrylic resin (C) may have a weight average molecular weight of about 5,000 to about 100,000. In other exemplary embodiments, the (meth)acrylic resin (C) may have a weight average molecular weight of about 95,000 to about 150,000 or about 120,000 to about 250,000.

The (meth)acrylic resin (C) of the present invention may have a linear structure. The (meth)acrylic resin (C) may have a refractive index of about 1.45 to about 1.494, for example about 1.47 to about 1.494. In exemplary embodiments, the (meth)acrylic resin (C) may have a refractive index of about 1.45, 1.46, 1.47, 1.48, 1.49, 1.491, 1.492, 1.493, or 1.494. Further, according to some embodiments of the present invention, the methacrylic resin (C) may have a refractive index in a range from about any of the foregoing refractive indices to about any other of the foregoing refractive indices.

Examples of the (meth)acrylic monomer may include, but are not limited to, methyl methacrylate, ethyl methacrylate, n-propyl methacrylate, n-butyl methacrylate, benzyl methacrylate, hexyl methacrylate, methyl acrylate, ethyl acrylate, propyl acrylate, butyl acrylate, 2-ethylhexyl acrylate, and 2-ethylhexyl methacrylate. These (meth)acrylic monomers may be used alone or in combination with one another.

The (meth)acrylic resin (C) is an optional component, and the base resin including (A)+(B)+(C) as defined herein can include the (meth)acrylic resin (C) in an amount of about 0 to about 49% by weight, for example about 10 to about 49% by weight, and as another example about 20 to about 49% by weight. In an exemplary embodiment, the base resin may include the (meth)acrylic resin (C) in an amount of about 1 to about 18% by weight. In exemplary embodiments, the (meth) acrylic resin (C) may be present, i.e., in an amount greater than about 0% by weight. In some embodiments, the base resin may include the (meth)acrylic resin (C) in an amount of about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or 49% by weight. Further, according to some embodiments of the present invention, the amount of the (meth)acrylic resin (C) can be in a range from about any of the foregoing amounts to about any other of the foregoing amounts. In other embodiments of the invention, the (meth)acrylic resin (C) may not be present (i.e., 0% by weight).

When a mixture of the methacrylic copolymer with high refractive index (B) and the (meth)acrylic resin (C) is blended with the polycarbonate resin, the difference between the refractive index of the (meth)acrylic resin (C) and the refractive index of the polycarbonate may be lowered due to the increased refractive index of the methacrylic copolymer resin (B). Therefore, it is possible to improve compatibility and transparency by preventing the deterioration of transparency and colorability usually occurring in a conventional mixture of a (meth)acrylic resin (for example, PMMA resin) and a polycarbonate resin due to the difference between the refractive index of the two resins. In addition, it is possible to prepare a resin composition having high transparency and colorability by improving scratch resistance in a conventional polycarbonate resin.

(D) Flame Retardant

The flame retardant of the present invention may be any conventional flame retardant used in the art. Examples of flame retardants suitable for use in the present invention include without limitation at least one or more of phosphorus-containing flame retardants, halogen-containing flame retardants, inorganic flame retardants, and the like, and combinations thereof.

In an exemplary embodiment, the flame retardant may be a phosphorus-containing flame retardant. Examples of the phosphorous-containing flame retardants may include, but are not limited to, phosphate, phosphonate, phosphinate, phosphine oxide, phosphazene, a metal salt thereof, and the like, and combinations thereof.

A representative compound among phosphorus containing flame retardants may be a phosphate ester compound or phosphate and may be represented by the following Chemical Formula 3.

[Chemical Formula 3]

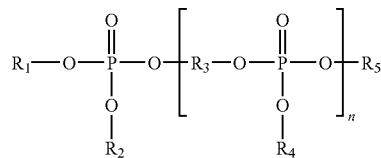

wherein $R_1$, $R_2$, $R_4$, and $R_5$ are independently $C_6$-$C_{20}$ aryl or $C_1$-$C_6$ alkyl substituted $C_6$-$C_{20}$ aryl group; $R_3$ is a derivative of a dialcohol such as resorcinol, hydroquinol, bisphenol-A, bisphenol-S and the like, and combinations thereof; and n is about 0 to about 5. In some exemplary embodiments, n may be about 1 to about 5.

The aromatic phosphate ester compound may be used alone or in combination with other phosphorus containing flame retardants in an amount of about 5 to 40 parts by weight, for example about 10 to about 35 parts by weight, based on about 100 parts by weight of the base resin comprising (A)+(B)+(C). In some exemplary embodiments, the aromatic phosphate ester compound may be used in an amount of about 12 to about 37 parts by weight, based on about 100 parts by weight of the base resin comprising (A)+(B)+(C). In some embodiments, the base resin may include the aromatic phosphate ester compound alone or in combination with other phosphorus containing flame retardants in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the aromatic phosphate ester compound alone or in combination with other phosphorus containing flame retardants can be in a range from about any of the foregoing amounts to about any other of the foregoing amounts.

In another exemplary embodiment, the flame retardant may be a halogen-containing flame retardant. Examples of the halogen-containing flame retardant may include, without limitation, decabromo diphenylether, decabromo diphenylethane, tetrabromo bisphenol A, tetrabromo bisphenol A-epoxy oligomer, octabromo trimethylphenyl phosphate, ethylene bistetrabromophthalimide, tris (tribromophenol)triazine, brominated polystyrene, and the like. These may be used alone or in combination with one another.

In some exemplary embodiments, a halogen-containing compound which is able to melt at conventional process temperatures, for example, a halogen-containing compound having a melting point or a softening point under about 250° C., may be used. When the halogen-containing compound is used, inorganic compounds such as antimony trioxide and antimony pentoxide may be used depending on its use.

The halogen-containing compound may be used alone or in combination with other halogen-containing compounds or inorganic compounds in an amount of about 5 to about 40 parts by weight, for example about 10 to about 35 parts by weight, based on about 100 parts by weight of the base resin comprising (A)+(B)+(C). In some exemplary embodiments, the halogen-containing compound may be used in an amount of about 12 to about 37 parts by weight, based on about 100 parts by weight of the base resin comprising (A)+(B)+(C). In some embodiments, the base resin may include the halogen-containing compound alone or in combination with other halogen-containing compounds or inorganic compounds in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the halogen-containing compound alone or in combination with other halogen-containing compounds or inorganic compounds can be in a range from about any of the foregoing amounts to about any other of the foregoing amounts.

If the amount of the flame retardant is less than about 5 parts by weight, flame retardancy rating of V0 or V1 may not be obtained and compatibility may be lowered and thus a flow mark may be formed. If the amount of the flame retardant is more than about 40 parts by weight, thermal resistance and compatibility may be deteriorated and thus a flow mark may be formed.

Depending on its use, the thermoplastic resin composition may further comprise at least one or more additives selected from the group consisting of surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, and flameproof agents. These additives may be used alone or in combination with one another and may be used in conventional amounts.

When observing the resin composition of the present invention in an X 7.5K TEM image, it can be seen that the (meth)acrylic resin and the polycarbonate resin do not form discrete phases but form a homogeneous phase. In some exemplary embodiments, it is confirmed by an X 7.5K TEM image that the (meth)acrylic resin and the polycarbonate resin may form a substantially homogenous and continuous phase, and the flame retardant may form a dispersed phase therein.

In exemplary embodiments, the resin composition can have a scratch width of about 220 to about 340 µm measured by ball-type scratch profile test (BSP test). In an exemplary embodiment, the resin composition has a scratch width of about 225 to about 290 µm or 225 to about 285 µm. In another exemplary embodiment, the resin composition has a scratch width of about 295 to about 335 µm or 300 to about 330 µm.

In other exemplary embodiments, the thermoplastic resin composition can have a total light transmittance of about 25 to about 45% measured by Haze meter NDH 2000 manufactured by Nippon Denshoku. In other exemplary embodiments, the total light transmittance may be about 27 to about 35%. In another embodiment, the total light transmittance may be about 34 to about 38%. In another embodiment, the total light transmittance may be about 37 to about 42%.

In another exemplary embodiment, the resin composition can have a scratch width of about 220 to about 340 µm measured by ball-type scratch profile test (BSP test), a total light transmittance of about 25 to about 45% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 75 to about 99° C. measured in accordance with ASTM D-1525.

In another exemplary embodiment, the resin composition can have a scratch width of about 288 to about 340 µm measured by ball-type scratch profile test (BSP test), a total light transmittance of about 38 to about 45% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 78 to about 99° C. measured in accordance with ASTM D-1525.

In another exemplary embodiment, the resin composition can have a scratch width of about 225 to about 289 µm measured by ball-type scratch profile test (BSP test), a total light transmittance of about 25 to about 35% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 78 to about 99° C. measured in accordance with ASTM D-1525.

The resin composition of the present invention may be prepared by conventional methods. For example, the aforementioned components and selectively other additives may be mixed together in a mixer, the mixture may be melt-extruded through a conventional extruder into a pellet form, and then the resin pellets may be used to prepare plastic molded articles by various molding techniques, such as but not limited to injection, extrusion, and casting molding techniques.

The present invention provides a molded article produced from the thermoplastic resin composition. Since the thermoplastic resin composition can have excellent transparency, thermal resistance, scratch resistance, colorability, and compatibility, the thermoplastic resin composition may be molded into various articles such as housings and parts for electrical and electronic goods.

In some exemplary embodiments, the thermoplastic resin composition may be molded into TVs, audio sets, washing machines, blenders, electric ovens, cassette players, MP3 players, telephones, mobile phones, game devices, video players, computers, printers, photocopiers, and the like.

The molding methods may be, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto.

EXAMPLE (A) Polycarbonate Resin

Bisphenol-A linear polycarbonate with a weight average molecular weight of 25,000 (Mw) manufactured by Teijin Chemicals Ltd. of Japan (product name: PANLITE L-1250 WP) is used.

(B) Methacrylic Copolymer Resin with High Refractive Index (B1) Methacrylic Copolymer With High Refractive Index The methacrylic copolymer with high refractive index is prepared by suspension polymerizing 70 parts by weight of phenyl methacrylate and 30 parts by weight of methyl methacrylate monomer. The resulting copolymer has a refractive index of 1.546 and a weight average molecular weight of 120,000 g/mol.

(B2) Methacrylic Copolymer with High Refractive Index

The methacrylic copolymer with high refractive index is prepared by suspension polymerizing 50 parts by weight of phenyl methacrylate and 50 parts by weight of a methyl methacrylate monomer. The resulting copolymer has a refractive index of 1.530 and a weight average molecular weight of 120,000 g/mol.

(B3) Methacrylic Copolymer with High Refractive Index

The methacrylic copolymer with high refractive index is prepared by suspension polymerizing 30 parts by weight of phenyl methacrylate and 70 parts by weight of methyl methacrylate monomer. The resulting copolymer has a refractive index of 1.514 and a weight average molecular weight of 120,000 g/mol.

(C) (Meth)acrylic Resin

Polymethylmethacrylate resin with a weight average molecular weight of 92,000 (Mw) manufactured by LG MMA Ltd. of South Korea (product name: L84) is used.

(D) Flame Retardant

Bisphenol A diphosphate manufactured by Daihachi Chemical Industry Co., Ltd. of Japan (product name: CR-741) is used.

Examples 1-8 and Comparative Examples 1-6

The components as shown in Table 1 and 6 parts by weight of a MBS-based impact modifier are added to a conventional mixer, and the mixture is extruded through a conventional twin screw extruder (L/D=29, ϕ=45 mm) to prepare a product in pellet form. The pellets are dried at 80° C. for 6 hours and then molded into test specimens with dimensions of L 90 mm×W 50 mm×t 2.5 mm in a 6 Oz injection molding machine.

(1) Flow mark: flow mark is measured using a test specimen with dimensions of L 90 mm×W 50 mm×T 2.5 mm for estimating compatibility of the thermoplastic resin composition. Whether the flow mark appears on the test specimen is measured by the naked eye.

(2) Total light transmittance: total light transmittance is measured by a Haze meter NDH 2000 manufactured by Nippon Denshoku, and calculated by adding diffuse light transmittance (DF) and parallel transmittance (PT). It can be estimated that the higher the total light transmittance is, the better transparency is.

(3) Flame Retardancy: the flame retardancy is measured in accordance with UL 94V using a 2.5 mm thick test specimen.

(4) Thermal resistance: vicat softening temperature (VST) is measured in accordance with ASTM D-1525.

(5) Scratch resistance: scratch resistance is measured by a ball-type scratch profile (BSP) test. The BSP is conducted by applying a scratch of a length of 10 to 20 mm onto resin specimens with dimensions of L 90 mm×W 50 mm×T 2.5 mm at load of 1,000 g and a scratch speed of 75 mm/min, using a metal spherical tip with a diameter of 0.7 mm and measuring a profile of the applied scratch through a surface profile analyzer (XP-I) manufactured by Ambios Corporation which provides a scratch profile through surface scanning using a metal stylus tip with a diameter of 2 μm. The scratch resistance is evaluated from a scratch width by the measured profile. The results of scratch width are shown in the following Table 1. Scratch profile pictures of a specimen prepared in Example 4 and Comparative Example 6, respectively, are shown in FIGS. 1(a) and (b). As the measured scratch width is decreased, the scratch resistance is increased. The unit of scratch width is μm.

Figure 2A:
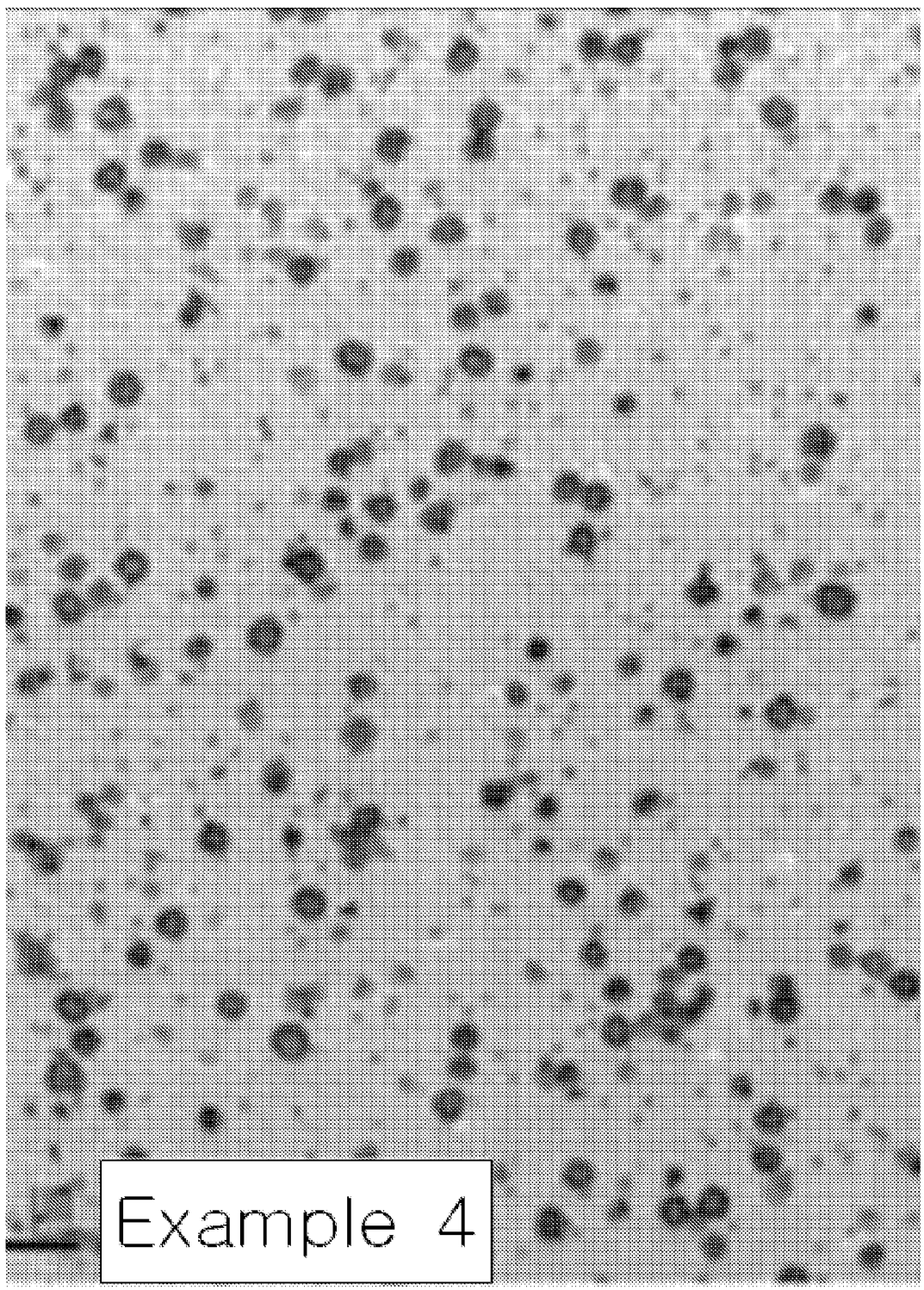
FIG. 2(a) is a transmission electron microscope (TEM) image of phase behavior of a specimen prepared in Example 4 and (b) is a transmission electron microscope (TEM) image of phase behavior of a specimen prepared in Comparative Example 4.
Figure 2B:
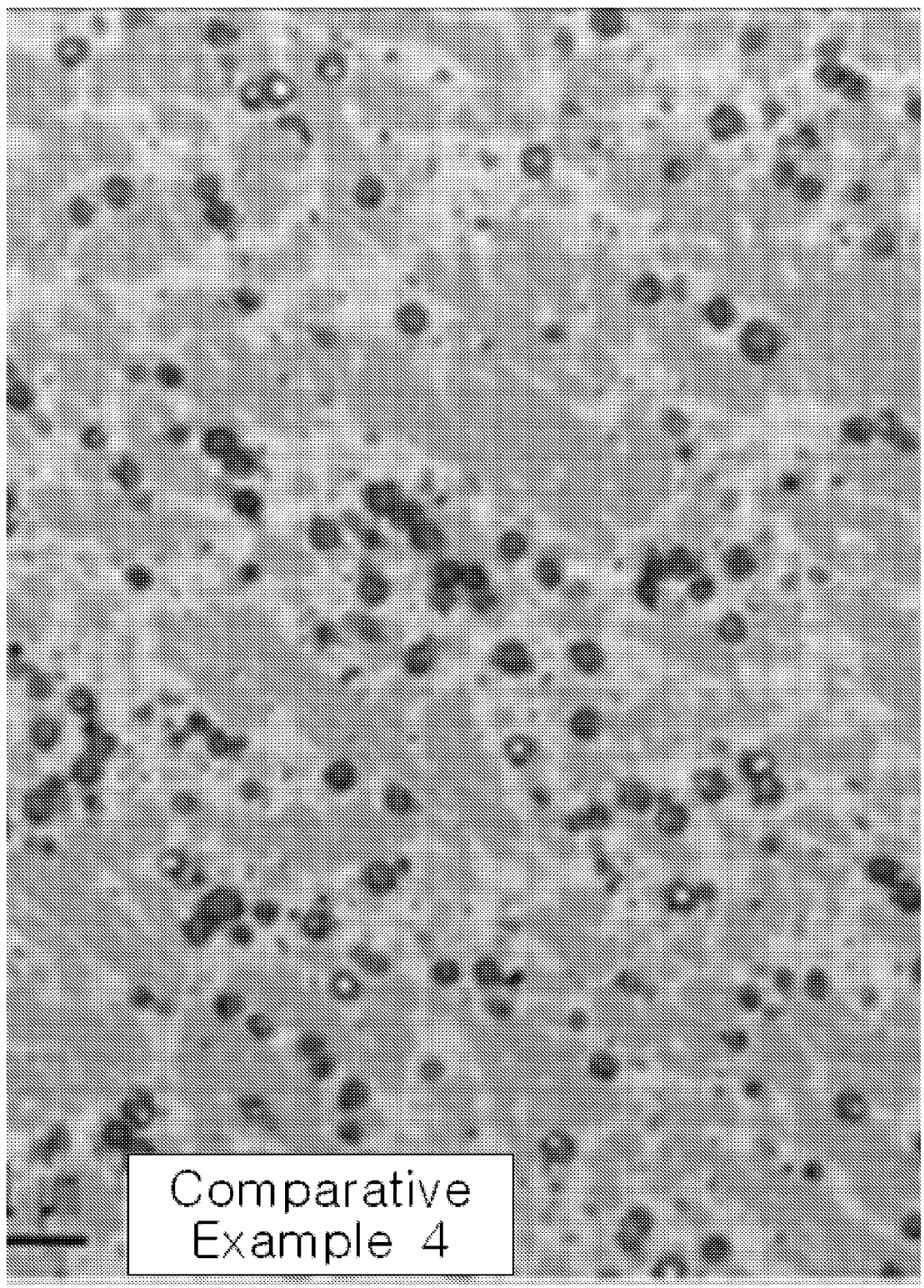

To analyze phase behavior, TEM images of resin compositions of Example 4 and Comparative Example 4, respectively, are shown in FIGS. 2(a) and 2(b).

TABLE 1

| | | | Examples | | | | | | | |
|---|---|---|---|---|---|---|---|---|---|---|
| | | | 1 | 2 | 3 | 4 | 5 | 6 | 7 | 8 |
| (A) | | | 60 | 60 | 60 | 70 | 70 | 70 | 70 | 70 |
| (B) | (B1) | | 40 | 40 | 40 | 30 | — | — | 15 | — |
| | (B2) | | — | — | — | — | 30 | — | — | 15 |
| | (B3) | | — | — | — | — | — | 30 | — | — |
| (C) | | | — | — | — | — | — | — | 15 | 15 |
| (D) | | | 25 | 35 | 15 | 15 | 15 | 15 | 15 | 15 |
| Flow Mark | | | X | X | X | X | X | X | X | X |
| Transparency and color | | | transparent | transparent | transparent | transparent | translucent | translucent | translucent | translucent |
| Total light transmittance (TT) | | | 40.28 | 39.80 | 40.03 | 38.28 | 35.82 | 32.25 | 31.01 | 27.96 |
| Flame retardancy | UL94 (2.5 mm) | | V0 | V0 | V1 | V0 | V0 | V0 | V0 | V0 |
| Thermal resistance | VST | | 87.2 | 79.1 | 94.3 | 95.4 | 94.5 | 95.1 | 95.3 | 95.0 |
| BSP | Width (μm) | | 269 | 267 | 271 | 289 | 288.2 | 289 | 288.4 | 289.7 |

| | | | Comparative Examples | | | | | |
|---|---|---|---|---|---|---|---|---|
| | | | 1 | 2 | 3 | 4 | 5 | 6 |
| (A) | | | 60 | 60 | 60 | 70 | 40 | 100 |
| (B) | (B1) | | — | 40 | 40 | — | 60 | — |
| | (B2) | | — | — | — | — | — | — |
| | (B3) | | — | — | — | — | — | — |

TABLE 1-continued

|  |  |  |  |  |  |  |  |
|---|---|---|---|---|---|---|---|
| (C) |  | 40 | — | — | 30 | — | — |
| (D) |  | 25 | 5 | 45 | 15 | 35 | 15 |
| Flow Mark |  | ○ | X | X | ○ | X | X |
| Transparency and color |  | Opaque milky | transparent | transparent | Opaque milky | transparent | transparent |
| Total light transmittance (TT) |  | 5.11 | 39.77 | 40.25 | 9.89 | 39.70 | 39.81 |
| Flame retardancy | UL94 (2.5 mm) | V0 | Fail | V0 | V0 | Fail | V0 |
| Thermal resistance | VST | 88.0 | 106.4 | 66.1 | 94.9 | 70.5 | 121.6 |
| BSP | Width (μm) | 270 | 273 | 267 | 290 | 246 | 345 |

Figure 1B:
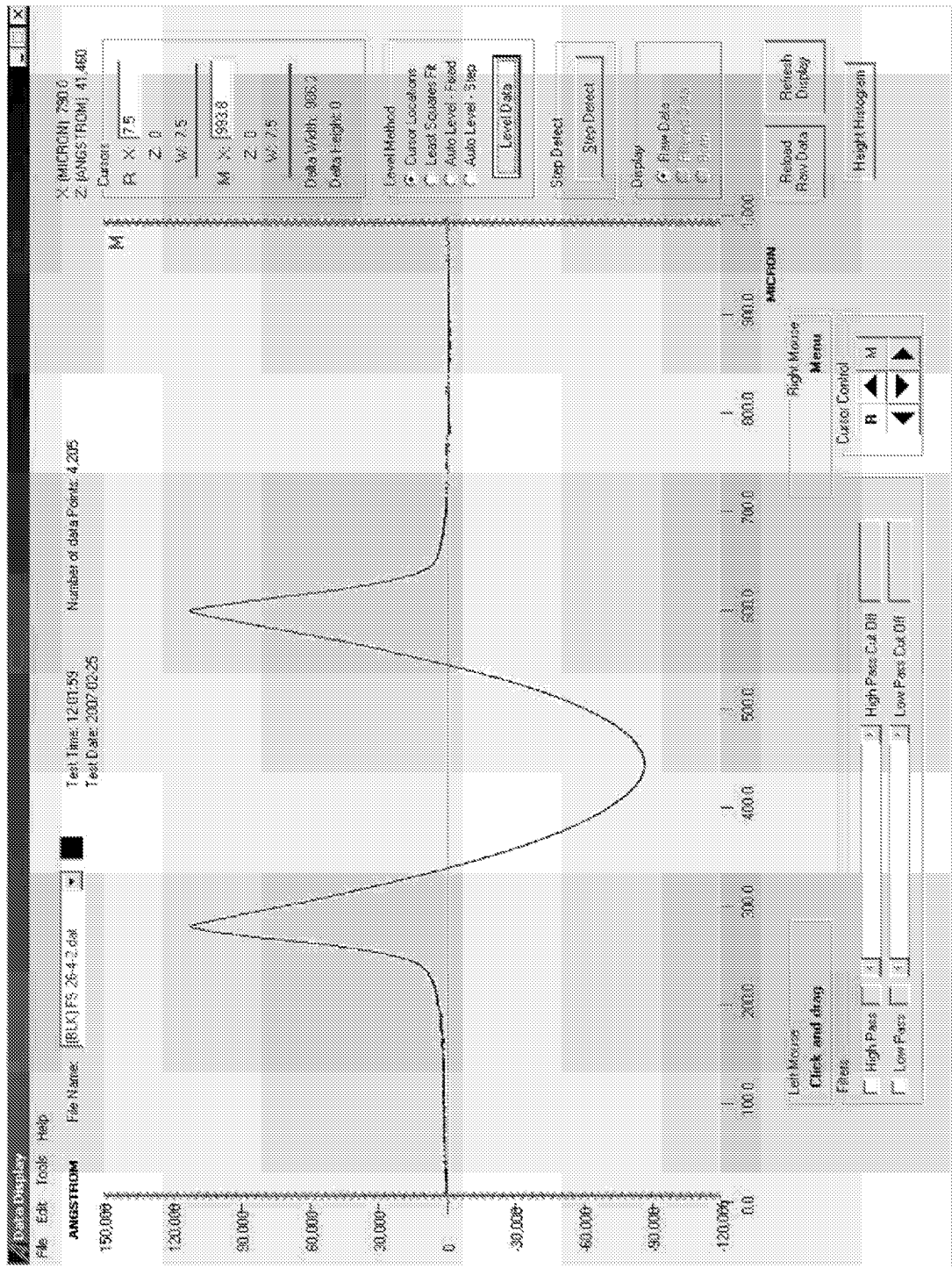

As shown in Table 1, when the polycarbonate and the acrylic resin are blended, improved scratch resistance is exhibited, compared to adding only the polycarbonate as in Comparative Example 6, which is also confirmed by the scratch profile (FIG. 1).

With respect to flame retardancy, the resin composition having more than 50% by weight of polycarbonate exhibits the higher level of flame retardancy of V0 or V1 measured in accordance with UL94 while using the flame retardant in the determined amount as in the present invention, whereas Comparative Example 5 using the polycarbonate in an amount of less than 50% by weight fails to obtain flame retardancy. Comparative Example 2 using the flame retardant in an amount of 5 parts by weight also fails to obtain flame retardancy. Furthermore, Comparative Example 3 using the flame retardant in an amount of 45 parts by weight can obtain flame retardancy, but exhibits such a low thermal resistance that it may not be suitable for use in many applications.

Although Comparative Examples 1 and 4 in which methacrylic copolymer resin with high refractive index is not added show better scratch resistance than Comparative Example 6 using only polycarbonate, they show flow mark and opaque appearance due to low compatibility between the resins. Examples 1-8 and Comparative Examples 1 and 4 using similar amounts of polycarbonate exhibit similar level of scratch resistance, whereas Examples 1-8 exhibit improvement in terms of transparency and flow mark and high total light transmittance.

Further, Example 4 using acrylic copolymer with high refractive index exhibits better transparency and compatibility and high total light transmittance, compared to Examples 5 and 6. The resin compositions not using the acrylic resin exhibit better transparency and compatibility compared to the resin compositions in which the methacrylic copolymer with high refractive index is mixed with the acrylic resin at the ratio 50 to 50.

The improved compatibility between polycarbonate and polymethylmethacrylate is confirmed by TEM images, also shown in FIG. 2. Although Comparative Example 4 exhibits a polymethylmethacrylate continuous phase and large domain in a polycarbonate base due to lowered compatibility, Example 4 exhibits improved compatibility since phase division of polymethylmethacrylate is not shown and homogenous phase with polycarbonate is shown.

The thermoplastic resin composition of the present invention can have good flame retardancy and scratch resistance, colorability, and good appearance due to its improved compatibility, and thereby it may be molded into plastic molded articles having better physical properties than conventional products, which may be applicable for various electrical and electronic appliances, parts of automobiles, lenses, window glasses, and the like.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A scratch-resistant flameproof thermoplastic resin composition, the resin composition comprising:
a base resin comprising (A) about 50 to about 90% by weight of a polycarbonate resin; (B) about 1 to about 50% by weight of a methacrylic copolymer resin with a refractive index of about 1.495 to about 1.590, wherein said methacrylic copolymer resin is a copolymer consisting of (b1) about 70 to about 90% by weight of an aromatic methacrylate, an aliphatic methacrylate, or a combination thereof represented by the following Chemical Formula 1, Chemical Formula 2, or a combination thereof; and (b2) about 10 to about 30% by weight of a mono-functional unsaturated monomer, wherein said mono-functional unsaturated monomer is a methacrylic acid ester monomer; acrylic acid ester monomer; unsaturated carboxylic acid monomer; acid anhydride monomer; hydroxyl group containing ester monomer; (meth)acrylamide monomer; unsaturated nitrile monomer; allyl glycidyl ether; glycidyl methacrylate; or a combination thereof:

[Chemical Formula 1]

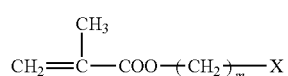

wherein m is an integer from 0 to 10, and X comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group;

[Chemical Formula 2]

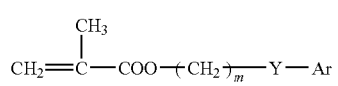

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group; and (C) about 0 to about 49% by weight of a (meth)acrylic resin; and (D) about 5 to about 40 parts by weight of a flame retardant, based on about 100 parts by weight of the base resin including (A)+(B)+(C).

2. The thermoplastic resin composition of claim 1, wherein said aromatic methacrylate, aliphatic methacrylate or combination thereof is selected from the group consisting of cyclohexyl methacrylate, 2-ethylphenoxy methacrylate, 2-ethylthiophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and combinations thereof.

3. The thermoplastic resin composition of claim 1, wherein said methacrylic acid ester monomer is methyl methacrylate, ethyl methacrylate, propyl methacrylate, butyl methacrylate, benzyl methacrylate, or a combination thereof; said acrylic acid ester monomer is methyl acrylate, ethyl acrylate, propyl acrylate, butyl acrylate, 2-ethyl hexyl acrylate, or a combination thereof; said unsaturated carboxylic acid monomer is acrylic acid, methacrylic acid, or a combination thereof; said acid anhydride monomer is maleic anhydride; said hydroxyl group containing ester monomer is 2-hydroxyethyl acrylate, 2-hydroxypropyl acrylate, monoglycerol acrylate, or a combination thereof; said (meth)acrylamide monomer is acryl amide, methacryl amide, or a combination thereof; and said unsaturated nitrile monomer is acrylonitrile, methacrylonitrile, or a combination thereof.

4. The thermoplastic resin composition of claim 1, wherein said methacrylic copolymer resin (B) has a weight average molecular weight of about 5,000 to about 300,000.

5. The thermoplastic resin composition of claim 1, wherein said acrylic resin (C) is a homopolymer or copolymer of an acrylic monomer comprising methyl methacrylate, ethyl methacrylate, n-propyl methacrylate, n-butyl methacrylate, benzyl methacrylate, hexyl methacrylate, methyl acrylate, ethyl acrylate, propyl acrylate, butyl acrylate, 2-ethylhexyl acrylate, 2-ethylhexylmethacrylate or a combination thereof.

6. The thermoplastic resin composition of claim 1, wherein said flame retardant (D) comprises a phosphorus-containing flame retardant, a halogen-containing flame retardant, an inorganic flame retardant, or a combination thereof.

7. The thermoplastic resin composition of claim 1, wherein said resin composition further comprises at least one additive selected from the group consisting of surfactants, nucleating agents, coupling agents, fillers, plasticizers, impact modifiers, antimicrobials, releasing agents, thermal stabilizers, antioxidants, light stabilizers, compatibilizers, inorganic fillers, coloring agents, stabilizers, lubricants, antistatic agents, pigments, dyes, flameproof agents, and combinations thereof.

8. The thermoplastic resin composition of claim 1, wherein said resin composition has a scratch width of about 220 to about 340 µm measured by ball-type scratch profile test (BSP test), a total light transmittance of about 25% to about 45% measured by means of a Haze meter NDH 2000 manufactured by Nippon Denshoku Co. Ltd., flame retardancy of V0 or V1 measured in accordance with UL-94V at a thickness of 2.5 mm, and vicat softening temperature (VST) of about 75 to about 99° C. measured in accordance with ASTM D-1525.

9. The thermoplastic resin composition of claim 1, wherein said polycarbonate resin (A) and said methacrylic copolymer resin with a refractive index of about 1.495 to about 1.590 (B) are not discrete from each other but form a homogeneous continuous phase, and wherein said flame retardant (D) is dispersed therein.

10. A molded article produced from the resin composition as defined in claim 1.

11. The thermoplastic resin composition of claim 1, comprising (C) greater than about 0 to about 49% by weight of said (meth)acrylic resin.

12. The thermoplastic resin composition of claim 11, comprising (C) about 10 to about 49% by weight of said (meth)acrylic resin.

13. The thermoplastic resin composition of claim 12, comprising (C) about 20 to about 49% by weight of said (meth)acrylic resin.

14. The thermoplastic resin composition of claim 1, comprising (C) about 1 to about 18% by weight of said (meth)acrylic resin.

15. The thermoplastic resin composition of claim 1, wherein said resin composition has a scratch width of about 220 to about 290 µm measured by ball-type scratch profile test (BSP test).

16. The thermoplastic resin composition of claim 1, comprising (D) about 12 to about 40 parts by weight of a flame retardant, based on about 100 parts by weight of the base resin including (A)+(B)+(C).

17. The thermoplastic resin composition of claim 1, comprising (D) about 15 to about 35 parts by weight of said flame retardant.

18. The thermoplastic resin composition of claim 16, wherein (D) said flame retardant is a phosphorus-containing flame retardant.

* * * * *